US010550815B2

(12) United States Patent
Anaykumar et al.

(10) Patent No.: US 10,550,815 B2
(45) Date of Patent: Feb. 4, 2020

(54) METHOD AND SYSTEM FOR CONTROLLING AN INTEGRATED STARTER-GENERATOR

(71) Applicant: SEDEMAC MECHATRONICS PVT LTD, Mumbai (IN)

(72) Inventors: Joshi Anaykumar, Nagpur (IN); Dixit Amit, Thane W (IN)

(73) Assignee: SEDEMAC MECHATRONICS PVT LTD, Mumbai (IN)

( * ) Notice: Subject to any disclaimer, the term of this patent is extended or adjusted under 35 U.S.C. 154(b) by 7 days.

(21) Appl. No.: 16/077,107

(22) PCT Filed: Feb. 13, 2017

(86) PCT No.: PCT/IN2017/000037
§ 371 (c)(1),
(2) Date: Aug. 10, 2018

(87) PCT Pub. No.: WO2017/138021
PCT Pub. Date: Aug. 17, 2017

(65) Prior Publication Data
US 2019/0048839 A1 Feb. 14, 2019

(30) Foreign Application Priority Data
Feb. 11, 2016 (IN) .............................. 201621004628

(51) Int. Cl.
*H02P 6/17* (2016.01)
*F02N 11/04* (2006.01)
(Continued)

(52) U.S. Cl.
CPC .............. *F02N 11/04* (2013.01); *F02D 29/06* (2013.01); *F02N 11/087* (2013.01); *H02P 6/16* (2013.01); *H02P 6/17* (2016.02); *H02P 6/20* (2013.01)

(58) Field of Classification Search
CPC ............... F02N 11/04; H02P 6/17; H02P 6/20
(Continued)

(56) References Cited

U.S. PATENT DOCUMENTS 9,000,696 B2 4/2015 Sanchez et al.
9,093,941 B2 7/2015 Lawrence et al.
(Continued)

OTHER PUBLICATIONS

United State Patent and Trademark Office (ISR/US), "International Search Report for PCT/IN2017/000037", US, dated Jun. 16, 2017.

*Primary Examiner* — Kawing Chan
(74) *Attorney, Agent, or Firm* — Tim Tingkang Xia, Esq.; Locke Lord LLP

(57) ABSTRACT

The invention relates to a method for controlling an integrated starter-generator, including receiving a start signal; determining an initial position of a rotor with respect to a stator phase winding integrated starter-generator of the integrated starter-generator; applying a pulse-width-modulated signal to the stator winding corresponding to determined initial position of the rotor; measuring current of the stator winding in response to applied pulse-width-modulated signal to determine current variation; if current variation is more than a threshold value, determining updated rotor position and applying a pulse-width-modulated signal to the stator winding corresponding to the updated rotor position; determining speed of the rotor, if speed of the rotor is more than a threshold value, monitoring a trigger signal from an ignition trigger sensor coupled to the engine; and if the trigger signal is received, determining the updated rotor position and exciting the stator winding corresponding to the updated rotor position.

7 Claims, 4 Drawing Sheets

(51) Int. Cl.
      *F02N 11/08*       (2006.01)
      *F02D 29/06*       (2006.01)
      *H02P 6/20*        (2016.01)
      *H02P 6/16*        (2016.01)

(58) Field of Classification Search
      USPC .......................................................... 318/149
      See application file for complete search history.

(56) References Cited

U.S. PATENT DOCUMENTS

| | | | |
|---|---|---|---|
| 9,160,264 B2 | 10/2015 | Hu | |
| 2012/0242265 A1* | 9/2012 | Richter | F02D 41/009 |
| | | | 318/400.11 |
| 2013/0272899 A1* | 10/2013 | Takahata | H02P 6/182 |
| | | | 417/44.11 |
| 2014/0132199 A1* | 5/2014 | Zanelato | H02P 1/42 |
| | | | 318/785 |

* cited by examiner

METHOD AND SYSTEM FOR CONTROLLING AN INTEGRATED STARTER-GENERATOR

FIELD OF THE INVENTION

The invention relates to an integrated starter-generator and more particularly to a method and a system for controlling an integrated starter-generator coupled to an internal combustion engine.

BACKGROUND OF THE INVENTION

An Integrated Starter Generator (ISG) system is generally used for the purpose of starting an Internal Combustion (IC) engine and for electric power generation. Typically an ISG system has a single electric machine connected to a crankshaft of a vehicle. For starting of IC engine, the electric machine is rotated which, in turn rotates the crankshaft. Such rotation should be at a sufficiently high speed before the self-sustaining combustion process can commence inside the IC engine. During a power generation operation, crankshaft rotates the electric machine to generate electric power required to charge a battery and power other electrical loads of the vehicle.

In a conventional ISG system, an electronic control unit (ECU) is placed between a battery and an electric machine of a vehicle where the ECU regulates bidirectional flow of electric power between the battery and electric machine. During engine start operation, the ECU draws power from the battery and feeds it to drive the electric machine, whereas during power generation operation, it regulates flow of electric power from the electric machine to charge the battery and also supply power to other electrical loads.

Most ISG systems use a permanent magnet brushless electric machine (BLDC machine). Such machines consist of a stator made of a polyphase winding, and a rotor made of permanent magnets. For optimal operation of ISG system, the ECU needs to excite the stator windings in a particular sequence with respect to the position of the rotor of the electric machine. In this regard, multiple hall-effect based sensors are typically used for sensing rotor position. Such sensors are placed either inside the stator windings or a separate magnetic ring is used to trigger the hall-effect based sensors. In either case, the sensors are needed to be placed inside a casing of the IC engine. An alternative to hall-effect based sensors is to use an absolute angle sensor of the crankshaft. However, such sensor also needs to be placed inside the engine casing.

Since such sensors are placed inside engine casing, they are subjected to harsh operating conditions such as high temperature and vibrations, which make them prone to failure. Further, a special arrangement is required for mounting the sensors which adds cost and occupies space inside the engine casing. Furthermore, the sensors need to be connected to ECU using wires for providing signals from the sensors to the ECU. For this purpose, a provision for routing of wires from sensors to ECU is also required. Further, any damage to wires impairs operation of the ISG system.

In view of the above there exists a need in the art to at least address the above mentioned problems.

SUMMARY OF THE INVENTION

Accordingly, the present invention in one aspect provides a method for controlling an integrated starter-generator coupled to an internal combustion engine. The integrated starter-generator comprises a rotor having a plurality of permanent magnet poles and a stator having a plurality of phase windings disposed on the stator, each phase winding including a plurality of coils. The method includes the steps of: receiving a start signal; determining an initial position of the rotor with respect to a stator phase winding; applying a pulse-width-modulated signal to the stator winding corresponding to determined initial position of the rotor; measuring current of the stator winding in response to applied pulse-width-modulated signal to determine current variation; if current variation is more than a threshold value, determining updated rotor position and applying a pulse-width-modulated signal to the stator winding corresponding to the updated rotor position; determining speed of the rotor, if speed of the rotor is more than a threshold value, monitoring a trigger signal from an ignition trigger sensor coupled to the engine; and if the trigger signal, is received, determining the updated rotor position and exciting the stator winding corresponding to the updated rotor position.

In another aspect, the present invention provides a system for controlling an integrated starter-generator coupled to an internal combustion engine. The integrated starter-generator comprises a rotor having a plurality of permanent magnets poles, and a stator having a plurality of phase windings disposed on the stator, each phase winding including a plurality of coils. The system includes an ignition trigger sensor adapted to be coupled to the engine for determining position of the rotor; a control unit coupled to the integrated starter-generator and configured to: receive a start signal; determine an initial position of the rotor with respect to a stator phase winding; apply a pulse-width-modulated signal to the stator winding corresponding to determined initial position of the rotor; measure current of the stator winding in response to applied pulse-width-modulated signal to determine current variation; if current variation is more than a threshold value, determine updated rotor position and applying a pulse-width-modulated signal to the stator winding corresponding to the updated rotor position; determine speed of the rotor, if speed of the rotor is more than a threshold value, monitor a trigger signal from the ignition trigger sensor; and if the trigger signal corresponds to a reference trigger signal, determine the updated rotor position and exciting the stator winding corresponding to the updated rotor position; and a power supply connected to the control unit and the ignition trigger sensor.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention is directed to a method and a system for controlling an integrated starter-generator coupled to an internal combustion engine.

Figure 1:
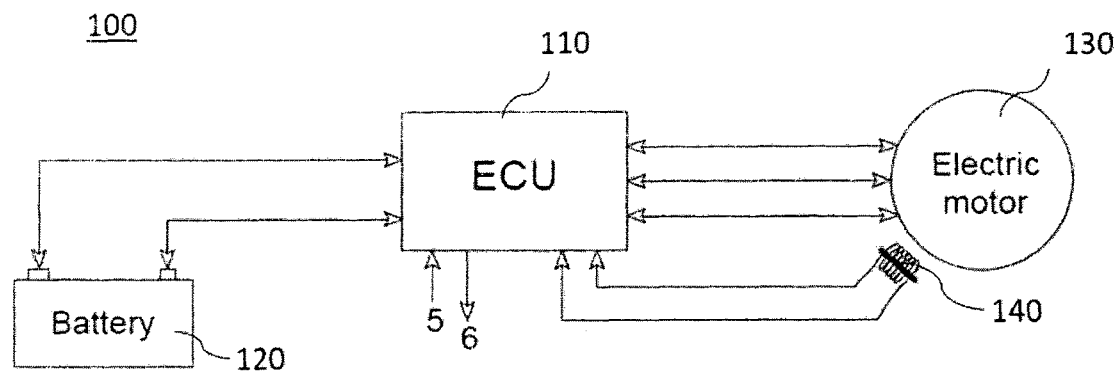
FIG. 1 illustrates a schematic view of a system for controlling an integrated starter-generator in accordance with an embodiment of the invention.

FIG. 1 illustrates a schematic view of a system 100 for controlling an integrated starter-generator 130 in accordance with an embodiment of the invention. The integrated starter-generator is a polyphaser permanent magnet electric machine such as an electric motor/generator coupled to an internal combustion engine. Such electric machine includes a rotor having a plurality of permanent magnet poles, and a stator having a plurality of phase windings disposed on the stator, each phase winding including a plurality of coils.

As shown, a control unit 110 is connected to a power supply 120 and the electric motor 130. In this regard, the control unit may be a dedicated or an onboard Electronic Control Unit (ECU) of a vehicle. The power supply may be a battery of the vehicle.

An ignition trigger sensor 140 coupled to the engine is provided to determine the angular position of a crankshaft. Based on various inputs in the form of voltage, current, speed of the electric motor, trigger signal from an ignition trigger sensor, etc, received by the ECU, the ECU determines position of the rotor. The ECU further provides requisite signal to excite the relevant stator windings based on the rotor position.

Figure 2:
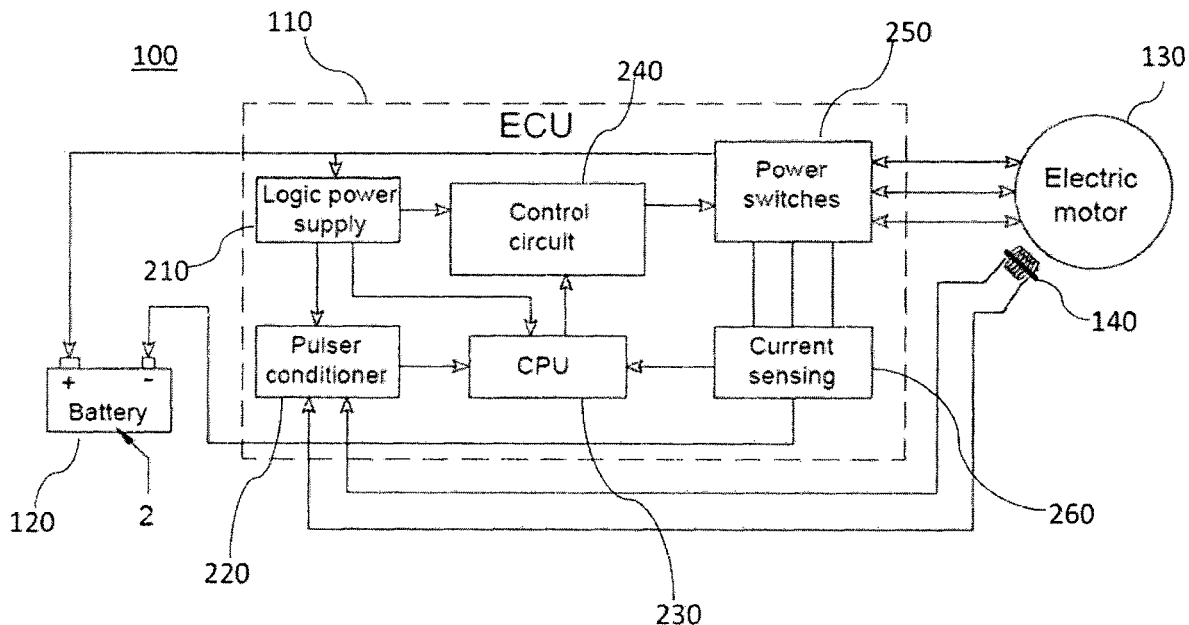
FIG. 2 illustrates architecture of a control unit in accordance with an embodiment of the invention.

FIG. 2 illustrates architecture of the control unit in accordance with an embodiment of the invention. The ECU comprises a set of power switches 250 used to selectively connect battery terminals to motor terminals. The power switches are driven by a control circuit 240. A current sensing circuit 260 converts the current flowing through the electric machine or through the battery in a form that can be read by a central processing unit (CPU) 230. The output of the ignition trigger sensor is supplied to a pulse conditioner or an ignition trigger processing circuit 220, which converts the output of the sensor in a form that can be read by CPU. The control circuit, pulse conditioner, and CPU are supplied power from a logic power supply 210.

Based on inputs received from current sensing circuit and ignition trigger sensing circuit, the CPU determines position of the rotor and sends commands to the control circuit, which actuates appropriate power switches to connect selected terminals of motor to battery terminals.

Figure 3:
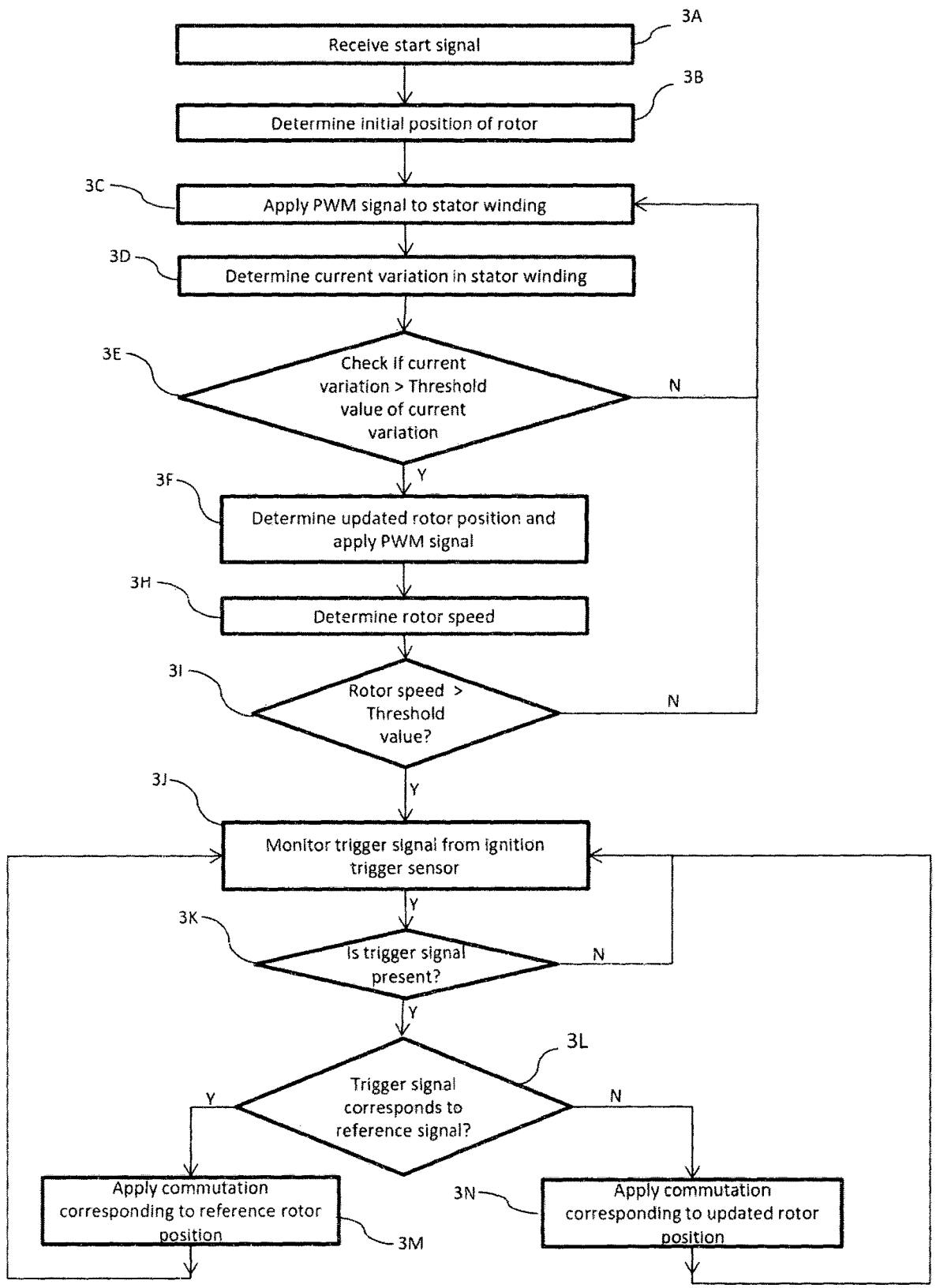
FIG. 3 shows a flowchart illustrating steps taken to control an integrated starter-generator in accordance with an embodiment of the invention.

FIG. 3 shows a flowchart illustrating steps taken to control an integrated starter-generator in accordance with an embodiment of the invention. At step 3A, the CPU checks if a start command is received. If no start command is received, the CPU remains in step 3A. If a start command is received, in step 3B, the CPU determines an initial position of the rotor with respect to a stator phase winding.

For determination of initial position of the rotor with respect to the stator phase winding, CPU selects a pair of stator phase windings and a voltage signal is applied across the selected pair of stator phase windings for a predetermined period of time. Current measurement is carried out for each of the selected windings and initial position of the rotor is determined based on the pair of stator phase windings for which the measured current is maximum. At step 3C, the CPU applies a pulse-width-modulated (PWM) signal to the stator winding corresponding to determined initial position of the rotor.

Figure 4:
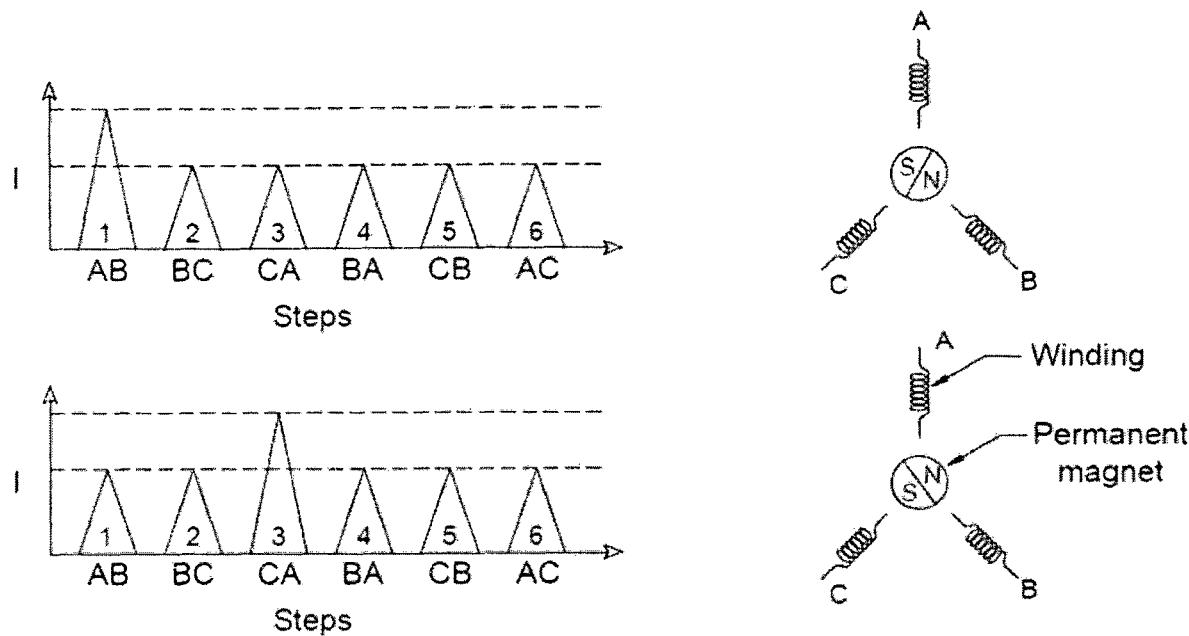
FIG. 4 is a graphical representation of results obtained while determining an initial position of a rotor in accordance with an embodiment of the invention.

FIG. 4 is a graphical representation of results obtained while determining an initial position of a rotor in accordance with an embodiment of the invention. It shows result of a typical initial position estimation procedure, which shows the current detected by current measurement circuit for a set of commands for two different rotor positions. As seen from the figure, the current detected by the current measurement circuit for all commands is not same. The current detected corresponding to one command is substantially more than others. The command corresponding to which the current is more is different for different rotor positions.

Thus, by observing the command for which the detected current is maximum, it is possible to determine the rotor position.

At step 3D, the CPU measures current of the stator winding in response to applied PWM signal to determine current variation. At step 3E, current variation is compared with a threshold value of stator current variation. In case the current variation is more than a threshold value, updated rotor position is determined at step 3F and a PWM signal is applied to the stator winding corresponding to the updated rotor position. In case the current variation is less than the threshold value, the method moves back to step 3C where a PWM signal is applied to the stator winding corresponding to the last updated position of the rotor and current of the stator winding in response to applied PWM signal is measured to determine current variation.

Figure 5:
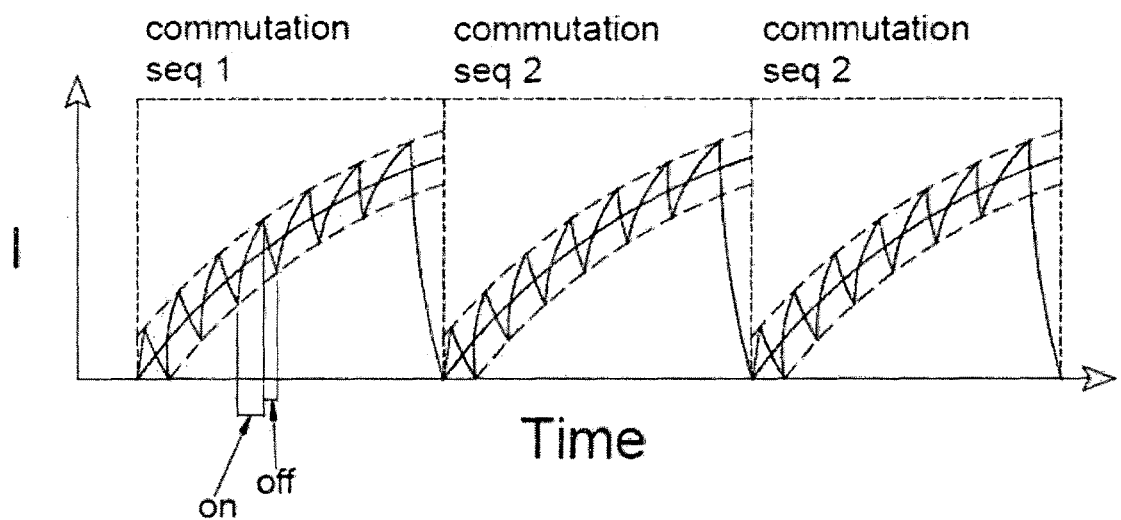
FIG. 5 is a graphical representation of current variation and commutation based on current variation in accordance with an embodiment of the invention.

FIG. 5 is a graphical representation of current variation and commutation based on current variation in accordance with an embodiment of the invention. A PWM control sequence consists of an on-time, when the chosen motor terminal is connected to the battery terminals and an off-time, where the current in motor terminals is allowed to recirculate through the power switches. As shown in the figure, during the on-time of the PWM control, the output of the current measurement circuit rises, while during the off-time, the output of the current measurement circuit falls due to energy lost in resistance of motor windings and in power switches. The extent of the rise and fall during the PWM operation is a function of inductance of the electric machine. Higher inductance leads to higher resistance to change in current, leading to lower extent of rise and fall, while a lower inductance leads to lower resistance to change in current, leading to higher extent of rise and fall. Moreover, the inductance of the machine is a function of rotor position. Thus, as the electric machine runs, its rotor position and hence the inductance changes periodically. This change in inductance leads to change in extent of current rise and fall. Thus, by observing this extent in rise and fall of current, it is possible to determine when the excitation sequence needs to change.

At step 3H, speed of the rotor is determined and step 3I such speed is compared with a threshold value. If speed of the rotor is more than the threshold value, the CPU, at step 3J, monitors for a trigger signal from an ignition trigger sensor coupled to the engine. In case the rotor speed is less than the threshold value, the method again goes back to step 3C and a PWM signal is applied to the stator winding corresponding to the last updated position of the rotor and current of the stator winding in response to applied PWM signal is measured to determine current variation.

In an embodiment of the invention, prior to step 3I, rotor speed may be checked to determine the state of the electric motor. In case it is determined that the machine is standstill, i.e. rotor speed is zero, the CPU exits the method described in FIG. 3.

At step 3K, the method checks the presence of the trigger signal. If the trigger signal is detected, the CPU determines, at step 3L, whether such trigger signal corresponds to a reference trigger signal. If the trigger signal corresponds to the reference trigger signal then the method moves to step 3M and stator winding corresponding to the reference rotor position is commutated. In case the trigger signal does not corresponds to a reference trigger signal then the method moves to step 3N where an updated rotor position is determined and stator winding corresponding to the updated rotor position is excited.

Figure 6:
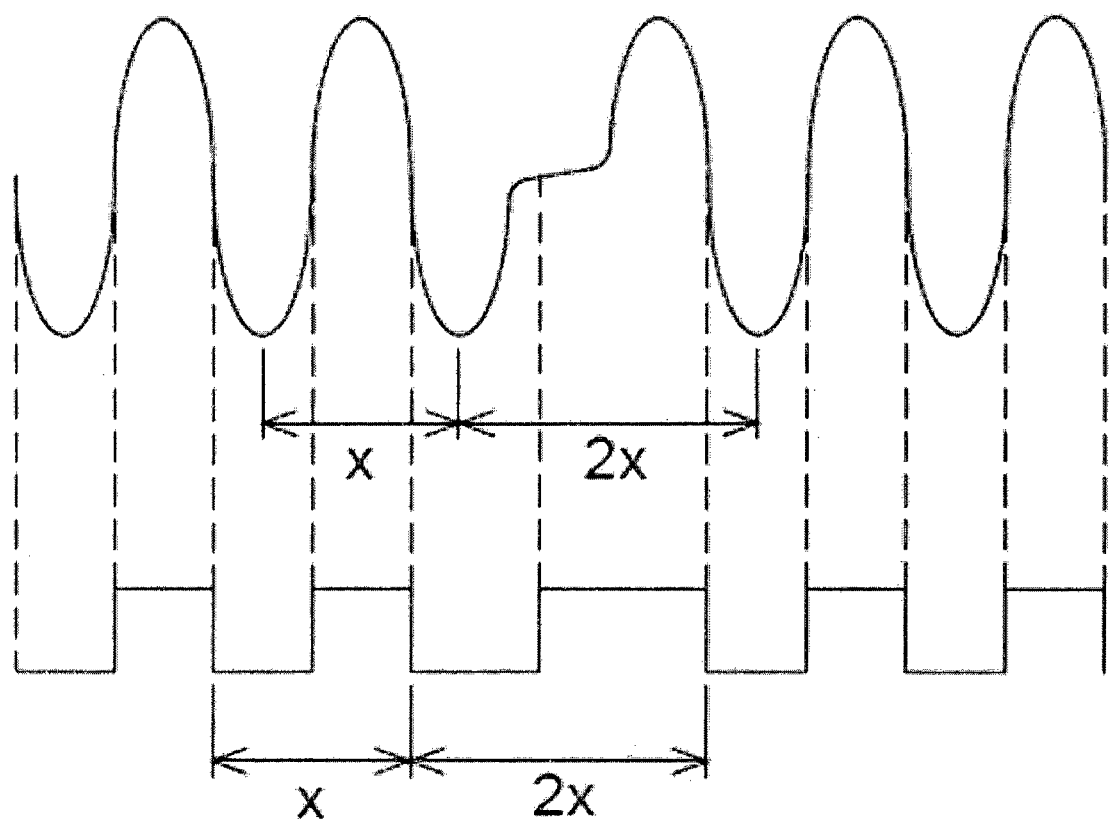
FIG. 6 is a graphical representation of output of an ignition trigger sensor in accordance with an embodiment of the invention.

FIG. 6 is a graphical representation of output of an ignition trigger sensor in accordance with an embodiment of the invention. The ignition trigger sensor is typically arranged to be triggered by a series of protrusions mounted on or near flywheel of engine. The pattern of protrusions is arranged so as to have some kind of circular non-uniformity such that it is possible, by observing the time between two triggers, to identify the non-uniformity which is demonstrated in the FIG. 6. The non-uniformity is arranged to be at a pre-determined location with respect to the engine position. Thus, processing of ignition trigger sensor allows identification of an absolute position of engine. By arranging the ignition trigger pulses to be at a pre-determined position with respect to rotor position, it is also possible to use it as an indicator of rotor position.

In an embodiment of the invention if the speed of the rotor is determined to be more than a threshold value: the CPU may monitor a voltage of the stator phase winding and compare such voltage with a threshold value. A trigger signal is generated if the voltage is more than the threshold value and updated rotor position is determined based on the trigger signal. Accordingly, stator winding corresponding to the updated rotor position may be excited. Hence, said embodiment may be used as an alternative to ignition trigger sensor.

Advantageously, using the ECU architecture described hereinbefore, it is possible to perform operation control of an integrated starter-generator using only the ignition trigger sensor placed in the engine casing.

While the present invention has been described with respect to certain embodiments, it will be apparent to those skilled in the art that various changes and modification may be made without departing from the scope of the invention as defined in the following claims.

The invention claimed is:

1. A method for controlling an integrated starter-generator, the integrated starter-generator coupled to an internal combustion engine and comprises a rotor having a plurality of permanent magnet poles, and a stator having a plurality of phase windings disposed on the stator, each phase winding including a plurality of coils, the method comprising the steps of:
   receiving a start signal;
   determining an initial position of the rotor with respect to a stator phase winding;
   applying a pulse-width-modulated signal to the stator winding corresponding to determined initial position of the rotor;
   measuring current of the stator winding in response to applied pulse-width-modulated signal to determine current variation;
   if current variation is more than a threshold value, determining updated rotor position and applying a pulse-width-modulated signal to the stator winding corresponding to the updated rotor position;
   determining speed of the rotor, if speed of the rotor is more than a threshold value, monitoring a trigger signal from an ignition trigger sensor coupled to the engine; and
   if the trigger signal is received, determining the updated rotor position and exciting the stator winding corresponding to the updated rotor position.

2. The method for controlling an integrated starter-generator as claimed in claim 1, wherein the step of determining an initial position of the rotor with respect to a stator phase winding comprises:
   (a) selecting a pair of stator phase windings;
   (b) applying a voltage signal across the selected pair of stator phase windings for a predetermined period of time;
   (c) measuring the current flowing through the selected windings;
   (d) repeating steps (a)-(c) for a newly selected pair of stator phase windings; and
   (e) determining position of the rotor based on the pair of stator phase windings for which the measured current is maximum.

3. The method for controlling an integrated starter-generator as claimed in claim 1, wherein if current variation is less than a threshold value or if speed of the rotor is less than a threshold value, then:
   applying a pulse-width-modulated signal to the stator winding corresponding to the last updated rotor position; and
   measuring current of the stator winding in response to applied pulse-width-modulated signal to determine current variation.

4. The method for controlling an integrated starter-generator as claimed in claim 1, wherein if the trigger signal corresponds to a reference trigger signal, commutating the stator winding corresponding to a reference rotor position.

5. The method for controlling an integrated starter-generator as claimed in claim 1, wherein if the trigger signal is not received, commutating the stator winding corresponding to the last updated rotor position.

6. The method for controlling an integrated starter-generator as claimed in claim 1, wherein if the speed of the rotor is more than a threshold value:
   monitoring a voltage of the stator phase winding;
   comparing the voltage with a threshold value;
   generating a trigger signal if the voltage is more than the threshold value;
   determining the position of the rotor based on the trigger signal; and
   exciting the stator winding corresponding to the updated rotor position.

7. A system for controlling an integrated starter-generator, the integrated starter-generator is coupled to an internal combustion engine and comprises a rotor having a plurality of permanent magnet poles, and a stator having a plurality of phase windings disposed on the stator, each phase winding including a plurality of coils, the system comprising:
   an ignition trigger sensor adapted to be coupled to the engine for determining position of the rotor;
   a control unit coupled to the integrated starter-generator and configured to:
      receive a start signal;
      determine an initial position of the rotor with respect to a stator phase winding;

apply a pulse-width-modulated signal to the stator winding corresponding to determined initial position of the rotor;

measure current of the stator winding in response to applied pulse-width-modulated signal to determine current variation;

if current variation is more than a threshold value, determine updated rotor position and applying a pulse-width-modulated signal to the stator winding corresponding to the updated rotor position;

determine speed of the rotor, if speed of the rotor is more than a threshold value, monitor a trigger signal from the ignition trigger sensor; and if the trigger signal is received, determine the updated rotor position and exciting the stator winding corresponding to the updated rotor position; and a power supply connected to the control unit and the ignition trigger sensor.

\* \* \* \* \*